United States Patent [19]

Martin et al.

[11] 4,192,701

[45] Mar. 11, 1980

[54] DOUBLE WALL PLASTIC ARTICLE AND METHOD AND APPARATUS FOR FORMING A DOUBLE WALL PLASTIC ARTICLE WITH A PAIR OF THERMOPLASTIC SHEETS

[76] Inventors: Raymond H. Martin, 228 W. Brown; Larry R. Brushaber, 3437 N. Branch Dr., both of Beaverton, Mich. 48612

[21] Appl. No.: 815,567

[22] Filed: Jul. 14, 1977

[51] Int. Cl.$^2$ .............................................. B29C 17/00
[52] U.S. Cl. ................................ 156/285; 264/296; 264/545; 264/553; 425/388
[58] Field of Search .................. 156/285, 287; 264/90, 264/94, 92, 96; 425/388

[56] References Cited

U.S. PATENT DOCUMENTS

| | | | |
|---|---|---|---|
| 3,220,902 | 11/1965 | Edwards | 156/287 |
| 3,281,301 | 10/1966 | Bolesky | 264/96 X |
| 3,520,750 | 7/1970 | Li et al. | 156/199 |
| 3,594,249 | 7/1971 | Mueller-Tamm | 156/199 |
| 3,616,033 | 10/1971 | Rausing | 156/287 |
| 3,741,842 | 6/1973 | Joa | 156/202 X |
| 3,850,716 | 11/1974 | Podvin | 156/82 |
| 3,867,088 | 2/1975 | Brown et al. | 425/504 |
| 3,935,358 | 1/1976 | Wyeth et al. | 156/285 X |

*Primary Examiner*—David A. Simmons

[57] ABSTRACT

A double wall plastic article and a method and apparatus for forming a double wall article with a pair of deformable thermoplastic sheets wherein the sheets are mounted, in face to face contiguous relation, on a single pair of laterally spaced longitudinally extending rails. The rail supported, contiguously disposed sheets are heated to forming temperature and are then subjected to differential forming pressures via a pair of opposed molds which seal to the sheets to fuze perimetrically extending, opposed portions of the sheets and form the border of the article being formed. Differential pressure is then applied to a central portion of at least one of the sheets within the formed border to withdraw the central portion and form the article.

23 Claims, 15 Drawing Figures

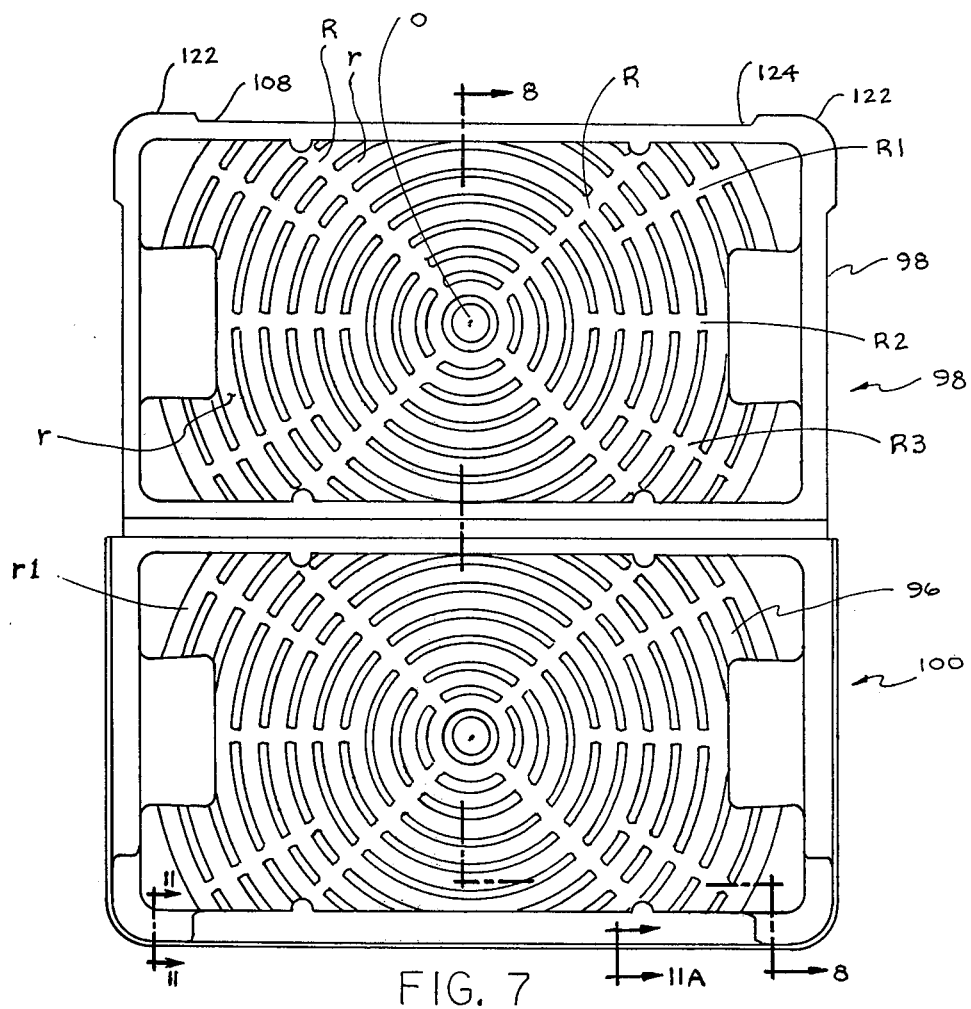
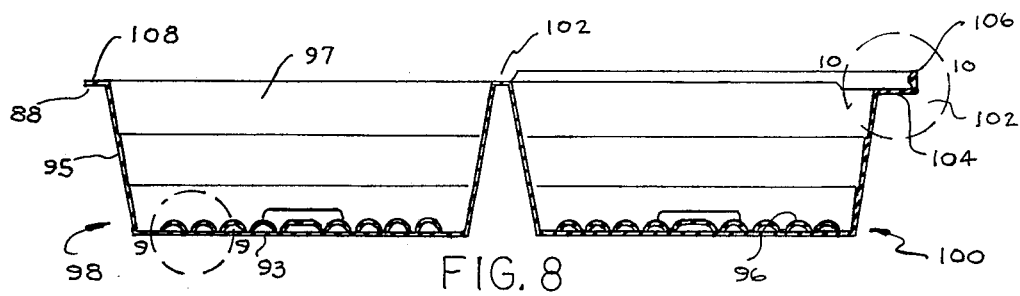
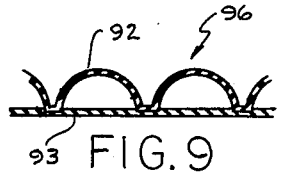
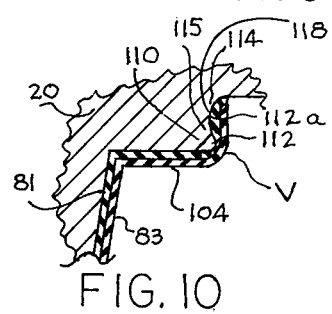
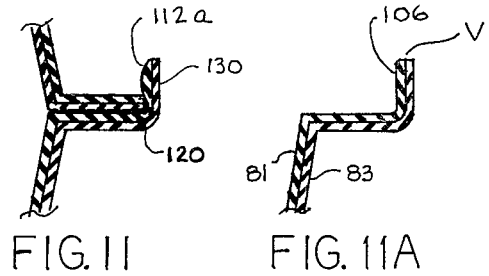

DOUBLE WALL PLASTIC ARTICLE AND METHOD AND APPARATUS FOR FORMING A DOUBLE WALL PLASTIC ARTICLE WITH A PAIR OF THERMOPLASTIC SHEETS

BACKGROUND OF THE INVENTION

This invention relates to a double wall plastic article formed with a pair of thermoplastic sheets and a method and apparatus for differential pressure forming a plastic article with a pair of deformable plastic sheets.

Double web, differential forming apparatus has been provided heretofore such as that disclosed in U.S. Pat. No. 3,583,036, granted to G. W. Brown on June 8, 1971. Such apparatus, however, is used only to form a single wall thickness vessel.

To increase the insulating characteristics of an article formed from a single plastic sheet, the sheet thickness can be increased, however, the use of higher density, thicker, single sheet plastic stock is relatively expensive. Accordingly, it is another object of the present invention to provide a plastic article having increased strength for reduced material cost.

It has been found that a double wall vessel has improved insulating characteristics. Moreover, for a given amount of material and a predetermined wall thickness, a double wall, especially one having walls separated by a gap, will exhibit increased physical strength and improved insulating characteristics as opposed to a single wall.

Accordingly, an object of the present invention is to provide a double wall plastic article which is aesthetically pleasing.

Another object of the present invention is to provide a double wall object and a method and apparatus for forming a double wall object having increased strength but utilizing the same amount of material.

The corrugation of one of the walls of the double wall article will result in increased wall strength. It is desirable that only the inner wall be corrugated so that the corrugations or ribs formed in the wall not be readily visible to a consumer purchasing a packaged product. With a single wall construction, when the inner wall surface is deformed to a particular shape, the outer wall surface will generally assume the same contour as the contour of the inner wall surface. Accordingly, it is an object of the present invention to provide a double wall plastic article having one wall thermoformed to a shape which does not follow the contour of the other wall.

A further object of the present invention to provide an article with a double layer wall including corrugations in one of the layers and a smooth outer exposed surface in the other of the layers.

It is another object of the present invention to provide an article of the type described including inner and outer walls, one of the walls having a plurality of perimetrically extending ribs and a plurality of perimetrically spaced, radially extending ribs joined to the perimetrically extending ribs but having different radial lengths.

It is another object of the present invention to provide a plastic container having upper and lower container portions which are releasably held together by a new and novel latch embodied in one layer of a double layer wall of one of the container portions.

Another object of the present invention is to provide a container having double layer wall including a latch receiving portion formed in only one of the layers.

Apparatus, such as that disclosed in U.S. Pat. No. 3,664,791 granted to G. W. Brown on May 23, 1972, has been provided heretofore for successively delivering a heated plastic sheet to a sheet heating station and then to a forming station. The Brown U.S. Pat. No. 3,664,791 discloses a single pair of laterally spaced endless chains which carry the sheet of plastic. The system disclosed in U.S. Pat. No. 3,664,791 has been previously used in twin sheet thermoforming by mounting a second plastic sheet on a second set of identical endless chains in vertically spaced relation with the set of chains illustrated in the drawings of U.S. Pat. No. 3,664,791. The opposed molds are then brought into engagement with the vertically spaced sheets to form single wall thickness, upper and lower opposed container halves which, after being formed, are then moved together into engagement to form an article similar to that illustrated in FIG. 3 of the Brown U.S. Pat. No. 3,583,036. One problem attendant with the prior art apparatus is that substantial scrap material results because the thermoplastic sheets used in the prior art apparatus must be substantially wider than the article to be formed to accommodate the vertical movement of the sheets between the vertically spaced positions and the adjacent sheet engaging positions. Moreover, the two sets of vertical chains are costly to build and maintain.

The known prior art, twin sheet thermoforming device generally includes air blowing apparatus for maintaining the thermoplastic sheets spaced apart, before forming and during forming, until the opposed container parts are formed. Such equipment is expensive to maintain. Accordingly, it is an object of the present invention to provide method and apparatus for forming a double wall article in a pair of contiguous thermoplastic sheets supported by a single set of laterally spaced, longitudinally extending rails.

It is another object of the present invention to provide a method and apparatus for forming a double wall article which will minimize the scrap material.

It is another object of the present invention to provide a method and apparatus of the type described which eliminates the air injection blow apparatus used heretofore to separate the sheets prior to forming.

Another object of the present invention is to provide a method and apparatus of the type described which compresses thermoplastic sheets together to fuze opposed portions of the sheets and then applying differential pressure to a central portion of at least one of the sheets within the fuzed sheet portions to withdraw the central sheet portion to complete the shape of the article.

Another object of the present invention is to provide method and apparatus of the type described for forming a double wall thickness plastic article, in a pair of thermoplastic sheets including method and apparatus for sealing opposed, border portions of the sheets and then drawing a central portion of one of the sheets away from the opposed central portion of the other sheet.

The method and apparatus according to the present invention mounts a pair of polystyrene foam sheets, such as oriented polystyrene, foam polystyrene or high impact polystyrene, in face-to-face contiguous relation. The sheets pass to a heating station and are heated to forming temperatures. The foam polystyrene will expand when heated. The molds are brought into engagement with the expanded, contiguous, foam sheets. The sheets are pushed together into a female mold cavity provided on one of the molds via a plug assist provided on the other of the molds. Vacuum is then applied to another cavity provided in the male plug assist to withdraw a portion of one sheet to form sheet strengthening ribs therein. The male plug assist is constructed such that the width of the ribs formed is much greater than the width of the fuzed portions to minimize the area of the sheet subjected to "chill" by the molds.

Another object of the present invention is to provide twin sheet thermoforming apparatus and a method of forming a double wall vessel including the step of pushing portions of contiguous sheets into a female mold with a male plug assist having ribs and cavities therein to concurrently fuse border edge portions and to fuze opposed central portions of the sheets and to thereafter withdraw other opposed central portions.

Other objects and advantages of the present invention will become apparent to those of ordinary skill in the art as the description thereof proceeds.

SUMMARY OF THE INVENTION

A double wall plastic article and a method and apparatus for differential pressure forming a double wall plastic article. The method includes mounting the sheets in contiguous face-to-face relation, heating the contiguously disposed sheets to a forming temperature and pressing opposed portions of the heated contiguous sheets together to mechanically join opposing border portions by compressive force to form a perimetrical border of the double wall of the article being formed and applying differential forming pressures to a central portion of at least one of the sheets to form a central wall portion of the article. Apparatus is provided for accomplishing the method. The article formed includes a wall comprised of twin sheets which are fused at their terminal edges as well as fused at selected central portions within the coterminal edges. Parts of one of the sheets within the terminal fuzed edges are withdrawn away from the opposing portion of the other sheet to form the finished product.

The present invention may more readily be understood by reference to the accompanying drawings in which:

FIG. 7 is a top plan view of an article formed, in an unfolded condition, according to the present invention;

FIG. 8 is a sectional end view taken along the line 8—8 of FIG. 7;

FIG. 9 is an enlarged sectional end view illustrating the portion of the container included in the circle 9—9 of FIG. 8;

FIG. 10 is an enlarged sectional end view of a container flange section enclosed in the circle 10—10 in FIG. 8, during the molding operation;

FIG. 11 is an enlarged sectional end view taken along the line 11—11 of FIG. 7, illustrating the container portions of FIG. 10 in a closed position;

FIG. 11A is a sectional end view of another container flange section, taken along the line 11A—11A of FIG. 7;

DESCRIPTION OF THE PREFERRED EMBODIMENT

Figure 1:
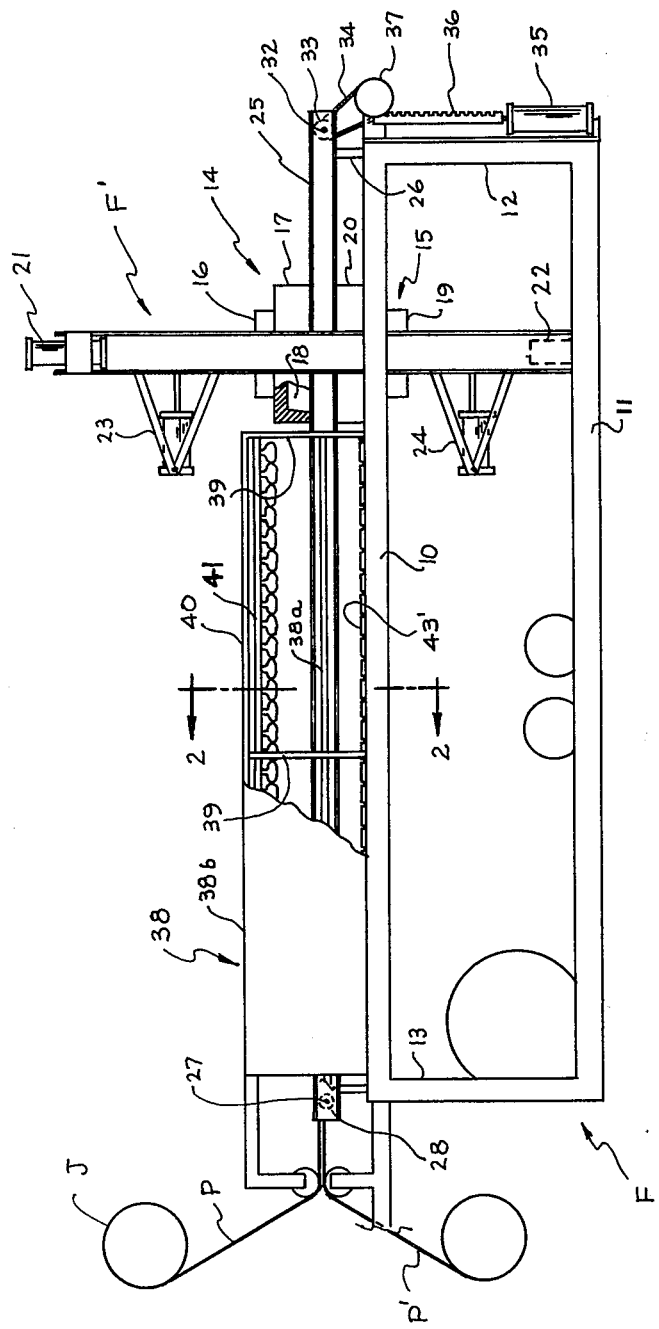
FIG. 1 is a side elevational view of apparatus constructed according to the present invention.

A differential pressure thermoforming machine similar to that described in U.S. Pat. No. 3,664,791 granted to G. W. Brown on May 23, 1972 and U.S. Pat. No. 3,346,923 granted to G. W. Brown, et al on Oct. 17, 1967, is disclosed in FIG. 1 and includes a frame F comprising upper and lower longitudinal frame members 10 and 11 respectively, joined at their ends by front and rear vertical members 12 and 13 respectively at each side of the machine. The end members 12 and 13 on each side of the machine are joined by cross brace members in the usual fashion.

Supported by the prefabricated frame F is a platen supporting subframe, generally designated F', which may be of the character disclosed in the aforementioned U.S. Pat. No. 3,346,923, U.S. Pat. No. 3,664,791 and U.S. Pat. No. 3,583,036 and all of these patents are incorporated herein by reference. The frame F' similarly mounts an upper mold assembly, generally designated 14, and a lower mold assembly, generally designated 15. The upper mold assembly 14 includes an upper platen 16 mounting a female mold 17 including mold cavities 18. The lower mold assembly 15 may comprise a lower platen 19 which mounts plug assist members 20 having a plurality of circumferentially extending and radially extending cavities C (FIG. 5) therein. The plug assist members 20 are in alignment with the cavities 18.

The upper and lower ends of the subframe F' mount actuating, fluid pressure operated cylinders 21 and 22 which move the platens 16 and 19 toward and away from a pair of foam polystyrene plastic sheets or webs P and P' which are indexed between the mold assemblies 14 and 15 when the mold assemblies are in separated positions in a manner which will later become apparent. The cylinders 21 and 22 may be, as described in U.S. Pat. No. 3,346,923, double acting air cylinders. Toggle linkage assemblies 23 and 24 may be utilized in the manner described in the aforementioned patents to prevent the differential pressures developed from separating the mold assemblies 14 and 15 during the forming operation. The structure and operation of the locking toggle assemblies 23 and 24 are well described in U.S. Pat. No. 3,346,923 and will not be repeated herein.

The sheets P, P' may comprise polystyrene foam sheets, having an 8 mil thickness, fed from frame mounted supply rolls J. Provided for intermittently moving the superposed plastic webs or sheets P and P' through the thermoforming machine is a sheet advancing system of the character described in U.S. Pat. Nos. 3,216,491 and 3,664,791 and also incorporated herein by reference.

Figure 3:
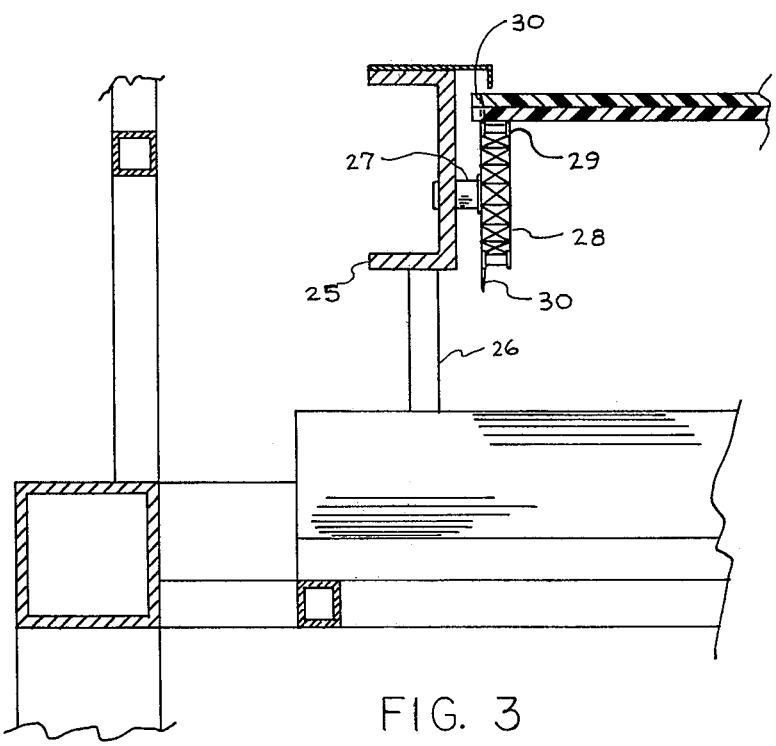
FIG. 3 is a further enlarged sectional end view illustrating a portion of the apparatus encircled in FIG. 2.
Figure 4:
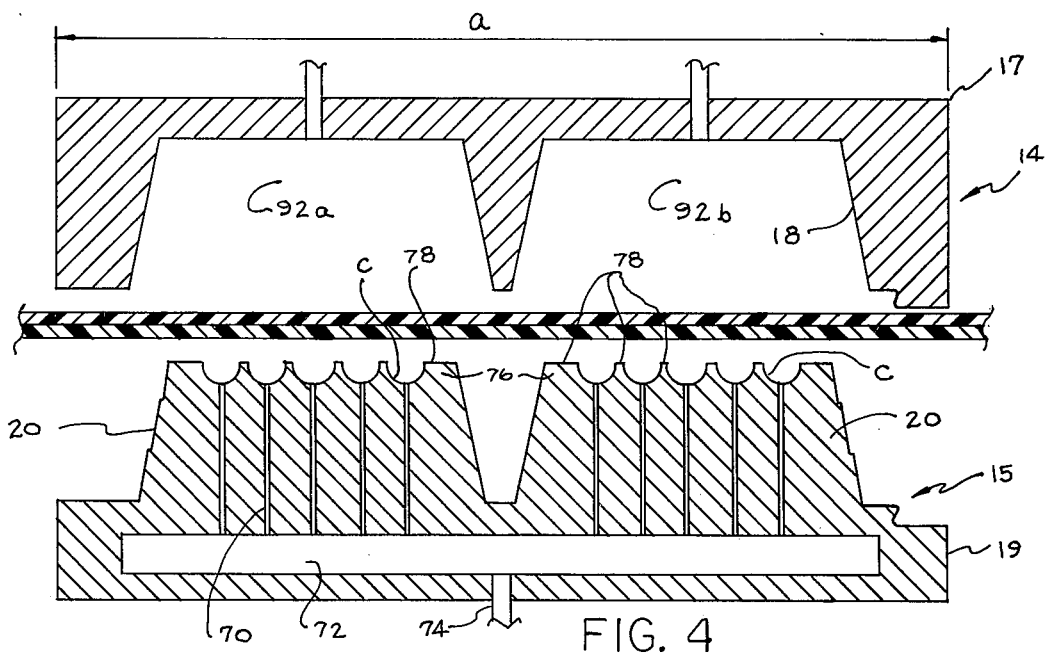
FIGS. 4–6 are views illustrating the molds in successive steps of manufacture.

As FIGS. 1 and 3 indicate, side rail support members 25, supported from the frame F by support bars 26, mount longitudinally spaced apart, rearward stub shafts 27 on which sprocket wheels 28 are journalled in a manner indicated in U.S. Pat. No. 3,216,491. Endless chains 29, trained around the rear sprocket wheels 28, mount longitudinally spaced apart plastic sheet penetrating pins 30 (FIG. 3) which are forced through the superposed contiguous plastic webs P at the longitudinal side edges thereof and operate to advance the superposed sheets P in predetermined increments of travel when the chains 29 are indexed in the usual manner. The chain 29 at each side of the machine is trained around a front sprocket wheel 28 mounted on a drive shaft 32 mounting a drive sprocket wheel 33 powered by a drive chain 34 which is actuated by a double-acting fluid pressure operated cylinder 35 via a rack 36 and a clutch 37 in a manner described in the U.S. Pat. No. 3,217,852, which is also incorporated herein by reference.

The cylinder 35 operates in timed relation with the mold assembly operating cylinders 21 and 22 to index the superposed plastic sheets P a distance corresponding substantially to the length a of the mold 17 at the conclusion of each molding operation and when the mold assemblies 14 and 15 have been withdrawn vertically from the sheets P.

Figure 2:
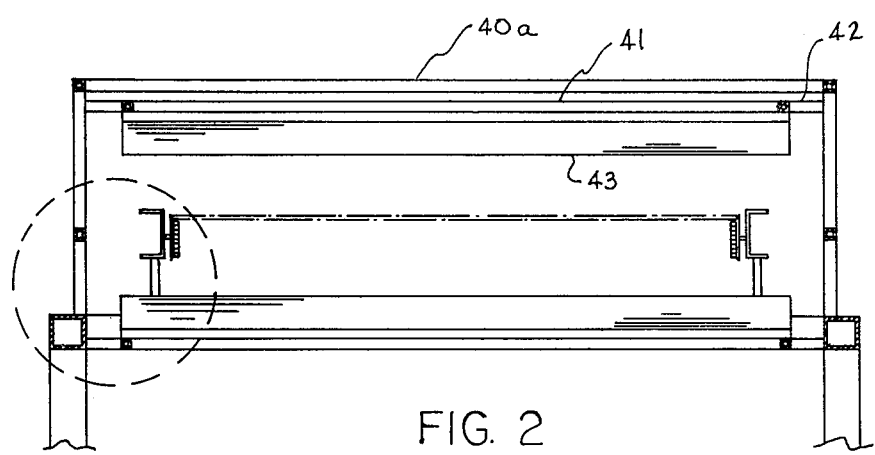
FIG. 2 is an enlarged sectional end view taken along the line 2—2 of FIG. 1.

Also mounted on the frame F of the mold assemblies 14 and 15 is a plastic web heating oven, generally designated 38, which includes a skeletal framework having supports 39 supporting upper longitudinal members 40 spanned by transverse brace members 40a (FIG. 2). Heater support bars 41, supported by cross supports 42, dependently mount stationary radiant heating elements 43. At the lower end of the oven, radiant heating elements 43' are similarly mounted in stationary position. As indicated, the skeletal tunnel framework of the oven, which has been described, is covered by sidewalls comprising side frame members 38a and a top wall or roof 38b open at its inlet and outlet ends. The sheets P comprise continuous sheets of foam polystyrene which, when heated by the radiant heaters 43, expand from an initial thickness of approximately 0.040 inches to approximately 0.080 inches. If desired, sheets of oriented polystyrene or high impact styrene could also be utilized. Although the sheets P, which are supplied by frame mounted supply rolls J, are heated to forming temperatures by the radiant heaters 43 and 43' the polystyrene foam sheets which are not yet subjected to mold pressures, do not stick together so that portions of the sheet can be subsequently separated to form the part as will become immediately apparent.

Figure 14:
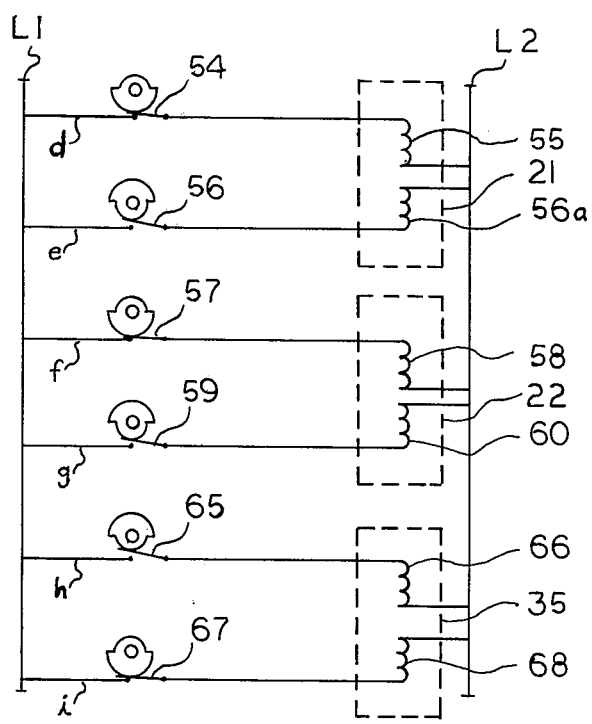
FIG. 14 is an electrical diagram schematically illustrating an electrical control circuit constructed according to the present invention for controlling the apparatus illustrated in FIGS. 1-6.

An electrical control system is illustrated in FIG. 14 for operating the apparatus illustrated in FIGS. 1–6. The circuit includes input lines L1 and L2, which are connected to a suitable power source, and circuit lines D1 connected in parallel across lines L1 and L2. Circuit line d includes a timing cam operated limit switch 54 connected in series with an advance solenoid 55 of upper mold operating cylinder 21. Circuit line e includes a cam operated limit switch 56 connected in series with a retract solenoid 56a of upper mold operating cylinder 21. Circuit line f incorporates a timing cam operated switch 57 which is connected in series with the advanced solenoid 58 of the lower mold operating cylinder 22. Circuit line g includes a timing cam operated switch 59 which is connected in series with a retract solenoid 60 of the lower mold operating cylinder 22.

A timing cam operated switch is included in circuit line h and when closed energizes retract solenoid 66 of the sheet advancing cylinder 35 to cause the advancing movement of the sheet P. Circuit line i includes the timing cam operated switch 67, which, when closed energizes the advance solenoid 68 of the cylinder 35 and returns the rack 36 to the position illustrated in FIG. 1.

Figure 5:
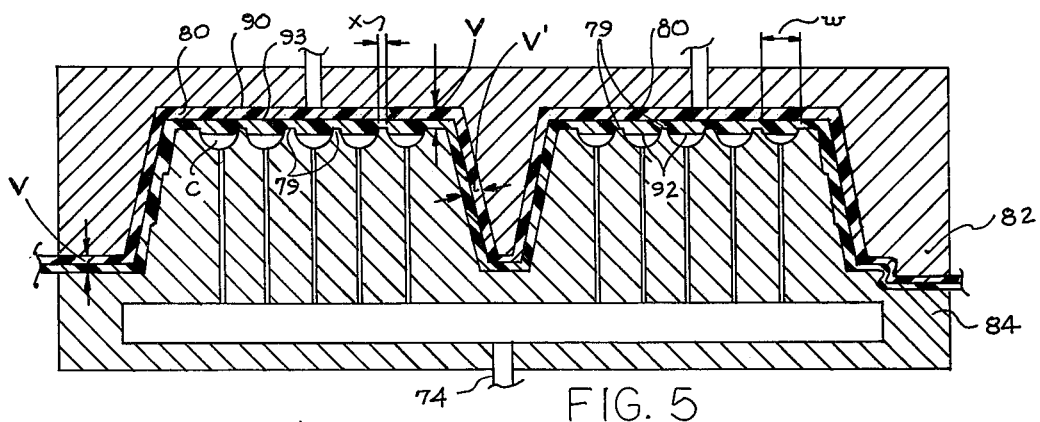

Vacuum ports 70 are provided in the plug assists 20 and extend between the channel cavities C to a manifold 72 communicating a source of vacuum, such as a vacuum pump, via a supply hose 74. Circumferentially extending and radially extending veins or plug assist portions 76, terminating in plug assist face portions 78, urge strip portions 79 of one plastic sheet P toward opposing strip portions 80 of the other plastic sheet P'. The upper and lower molds 14 and 15 include opposing border portions 82 and 84 respectively which compress the opposed perimetrically extending portions 85 and 86 of the sheets P to fuse the portions 85 and 86 together to form a unitary border or rim 88 (FIG. 8). When the border 88 is being formed, the male plug face portions 78 and opposed portions 90 of the female cavity 18 concurrently press the opposed central strip sheet portions 79 and 80 together to fuse the combined opposed central strip sheet portion 79 and 80 as illustrated in FIG. 5. The thickness V of the combined fuzed portions 78, 80 and rim 88 is slightly less than the thickness V' of the remainder of the walls or sheets P. After the border rim portions 88 and the central strip portions 79 and 80 are fuzed together, vacuum is applied to hose 74 to draw central sheet strip portions 92 adjacent the central strip portions 79, 80 (FIG. 6) downwardly away from the opposing sheet portions 93 into intimate engagement with the mold channels C to form the ribs 96 more particularly illustrated in FIGS. 7 and 8.

Figure 6:
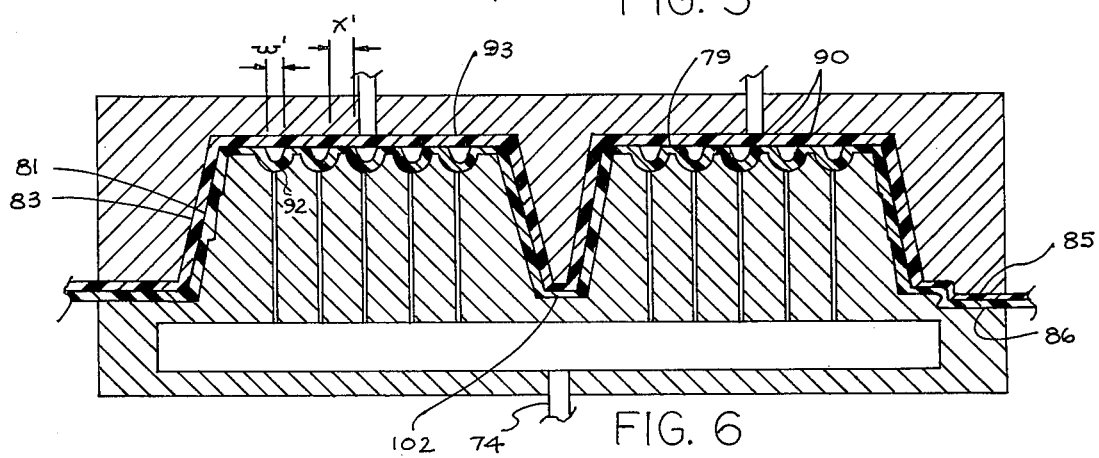

As illustrated, the cavity 18 includes two side by side lateral cavities 92a and 92b which, in combination with the male plug assist member 20 form the sheets P into double wall, upper and lower inverted container halves 98 and 100 coupled together by a double wall hinge 102. Each container half 98 and 100 includes inner and outer walls 81 and 83 cooperating to define a double sheet thickness base 93, and double-layer sidewalls 95 spanned by double layer end walls 97. The ribs 96 formed in the inner sheet or wall 81 comprises a plurality of continuous, circular ribs r and a plurality of radially extending, central circumferentially spaced ribs R interjacent the central fuzed strips 79, 80. The ribs R are of differing radial extents and include adjacent rib portions R1, R2, and R3 which radially overlap the adjacent ones of the rib portions R1, R2, and R3. The radially inner ends of the ribs R1, R2, and R3 terminate radially outwardly of the container center O and radially inwardly of the outermost rib r1. The ribs R are continuous between the bottom wall 93 and sidewalls 95. As illustrated in FIGS. 5 and 6 the width w of the channels C is substantially greater than the width X of the compressing face portions so that the resultant width w' of the ribs r & R is substantially less than the width X of the compressed sheet portions 79, 80 and 88. The arrangement minimizes the chill which the mold imparts to the plastic sheets. If the chill exceeds a predetermined amount, the sheet portions 78, 80 will not properly seal and join. In addition, this construction provides a container which has substantially increased vertical support strength. The chilling effect of the mold causes the skin S of the finished product to have a resilient skin.

The container halves 98 and 100 are generally identical with the exception that the walls 81, 83 of the container half 100 include an offset portion 102 having a laterally extending flange portion 104 terminating in an upstanding terminal flange 106. The container half 98 includes a lateral offset flange 108. As illustrated in FIG. 10, the corners of the upstanding flange 106 are recessed as illustrated 110 and the wall section has a smaller cross sectional thickness as compared to the cross sectional thickness V' (FIG. 11A) of the remaining portion of the upstanding flange 106 and the container lip.

The mold 20 includes two projecting portions 112 which compresses the inner wall or sheet 81 inwardly of the terminal edge 114 to form an undercut 115 in the inner wall 81 only of the container half 100. The mold 112 includes a recess 118 which receives a portion 112A of the material compressed by the projecting mold portion to form an enlarged bead 112A. When the molds 14 and 15 are separated, the material displaced by the mold portions 112 form corner undercuts 115 in the inner wall 81 of container half 100 to provide latch receiving recesses. As illustrated, the combined thickness of bead 112A and the adjacent portion of outer sheet 83 is less than the thickness V' of the uncompressed sheets 81 and 83.

The flange 108 of container half 98 includes a pair of projecting latches, tabs or ears 122 at the corners thereof. The flange 108 of container half 98 is recessed at 124 between the latches 122 and receives the thicker wall portion 112A of the opposite upstanding flange 106 on container half 100. When the container halves 98 and 100 are relatively swung from the open positions illustrated in FIG. 8 to the closed positions illustrated in FIG. 11, the latch members or projecting tabs 122 bear against the increased wall thickness beads 112A which yield outwardly and permit the tabs 122 to be received by latch receiving recesses 115.

As illustrated in FIG. 11, when the container halves 98, 100 are closed, the latch portions 122 are received with a friction fit in the undercuts 115. The bead 112A on container half 100, which was forced outwardly by the flange 108 of container half 98, is snap returned to the closed position, illustrated in FIG. 11, to secure the tabs 122 and hold the container halves together.

It is important to note that the formation of the undercuts 115 is accomplished without any deformation of the outer surface 130 of the opposing portion of the outer sheet or wall 83 as illustrated in FIG. 11.

Figure 12:
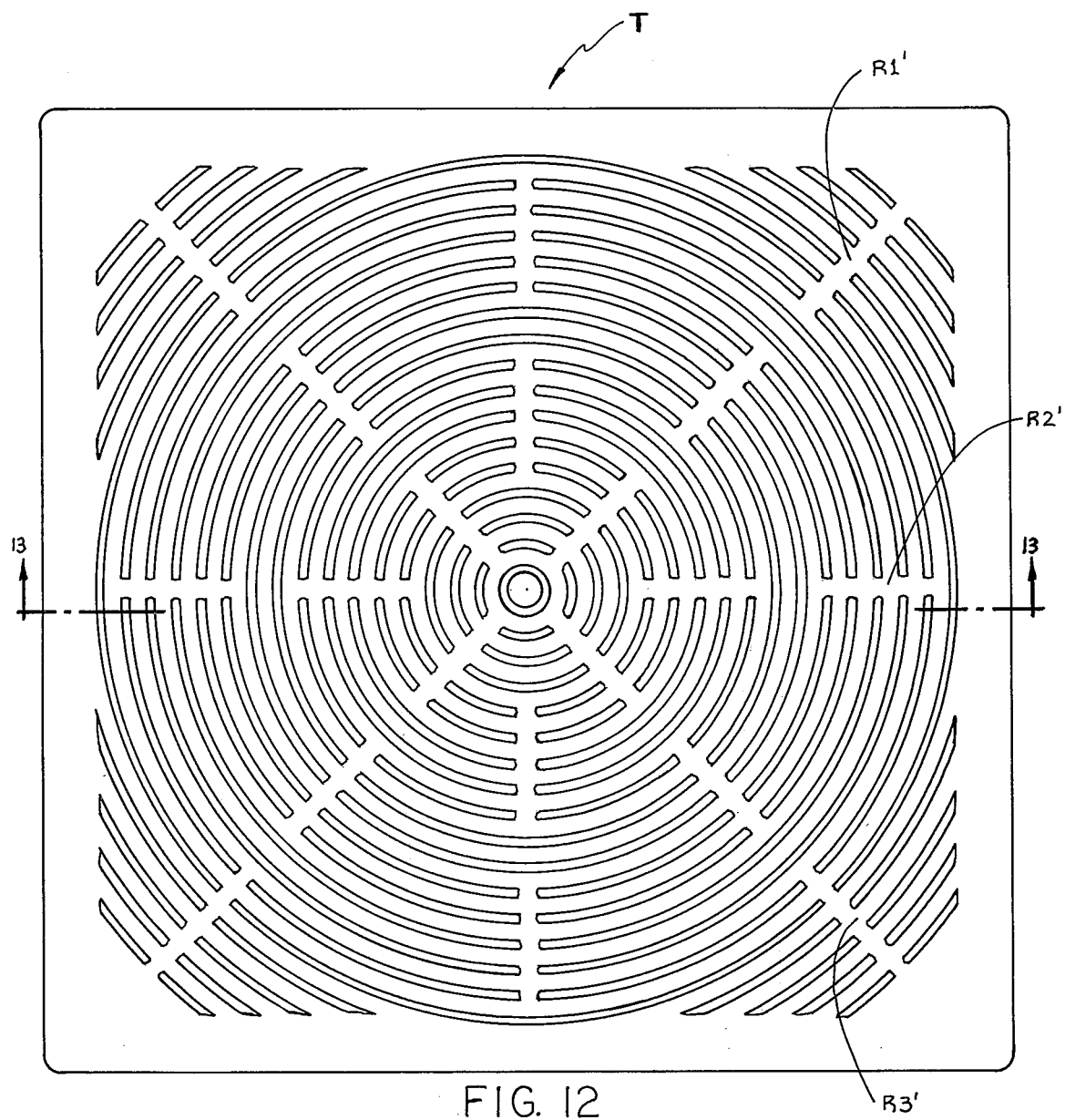
FIG. 12 is an under plan view illustrating a slightly modified container construction.
Figure 13:
FIG. 13 is a sectional end view, taken along the line 13—13 of FIG. 12.

A double-wall, generally planar, tray T can also be formed according to the method but with a shallower mold (not shown) of slightly different shape. The tray T is illustrated in FIGS. 12 and 13 and includes a corrugated lower wall 81' and a generally planar upper wall 83' surrounded by a fuzed perimetrically extending border 85'. The lower sheet 81' is corrugated to provide ribs R1', R2', and R3' identical to the ribs R1, R2, and R3. Parts corresponding to the container parts previously described are designated by the same numeral followed by a prime designation.

THE METHOD AND OPERATION

The continuous plastic sheets P and P' are intermittently forwardly fed in abutting face relation by the intermittently operated, single set of sheet supply chains 29. The sheet advance cylinder is operated to alternately drive the rack 36 in opposite directions so that the incremental sheet advance is followed by periods of dwell. As the plastic sheets P and P' proceed through the oven 28, they are gradually heated to forming temperature suitable to permit the mold assemblies 14 and 15 to form three dimensional articles, such as the coupled container sections 98, 100 in the webs P, P' during the periods of sheet dwell.

The retract solenoid 66 (circuit line h) is first energized with the closing of switch 65 by its timing cam to power the advancing chains 29 and move the juxtaposed sheets P forwardly an incremental distance a. Clutch 37 has been disengaged by the rack 36 and the rack 36 is returned to the position illustrated in FIG. 1. This occurs with the closing of the switch 67 and energization of the rack advancing solenoid 68. Thereafter the sheets P and P' remain stationary and the switches 54 and 57 (lines d and f) close to energize mold advance solenoids 55 and 58 and cause cylinders 21 and 22 to advance the mold assemblies 14 and 15 to a closed position in which they clamp the webs P and P' between them, followed by periods of dwell through the oven enclosure. As the mold assemblies 14 and 15 move from the spaced apart positions, illustrated in FIG. 4, to the closed positions, illustrated in FIG. 5, the opposed border mold portions 82 and 84 and the opposed central mold portions 76 and 90 will be pressed together to mechanically, compressively join or fuse the opposing border sheet portions 85, 86 and the opposing central portions 79, 80. As the molds 14 and 15 move together, a portion of both sheets P and P' are moved downwardly by plug assists 20, out of the planes of the sheets, into the female mold cavities 18. The opposing border sheet portions 85, 86 will form a perimetrical border of the container walls 95 of the article being formed. After the fusing of the opposing sheet parts 85, 86 and central portions 79, 80 is accomplished, differential pressure in the form of vacuum is applied to the plug assists vacuum ports 70 to cause the central sheet portions 92 of the sheet or inner wall 81 to withdraw away from the opposing central sheet portion 93 into intimate engagement with the cavity walls of the cavities C.

At the completion of the forming cycle, the switches 56 and 59 (lines e and g) are closed to energize the mold retract solenoids 56a and 60 and cause cylinders 21 and 22 to retract the upper and lower mold assemblies 14 and 15 respectively.

The sheets P and P' are advanced and the container, comprising unfolded container halves 98, 100, with the sheets P and P'. The container is thereafter cut or otherwise severed from the continuous sheets P, P' by a suitable blanking operation. Thereafter the cycle is continuously repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. A method of differential pressure forming a double wall, plastic article with a pair of individual deformable thermoplastic foam sheets comprising the steps of:
   mounting said individual foam sheets in face to face contiguous relation;
   heating said contiguously disposed, individual foam sheets to forming temperature and moving said foam sheets to positions between a pair of mold members, which are relatively movable between spread positions and closed, clamping positions, while maintaining the individuality of the foam sheets and without bonding the confronting faces of said foam sheets to each other;

then relatively moving said mold members from said spread positions to said closed molding positions to press opposing portions of said heated contiguous foam sheets together and bond said opposing portions to form a perimetrical border of the wall of the article being formed; and thereafter applying differential forming pressures to a first central portion of at least one of said foam sheets within said border to move said central portion from a position contiguous with an opposing contiguous portion of the other foam sheet to a position removed from said opposing contiguous portion to form a central wall portion of said article.

2. The method as set forth in claim 1 wherein said step of relatively moving said mold members includes the step of moving a pair of relatively movable molds, at least one of which includes a female mold cavity, between remote positions on opposite sides of said foam sheets to closed, clamping positions intimately engaging said opposing portions to form said border; said differential pressure applying step including the step of thereafter applying suction forces to said cavity to draw said central portion of said one foam sheet into said cavity.

3. The method as set forth in claim 2 wherein said step of relatively moving said molds also includes pressing a second central portion of said one foam sheet, adjacent said first central portion and within said border, into intimate engagement with an opposing contiguous second portion of the other foam sheet to fuse said second central portions together prior to said applying step.

4. The method set forth in claim 1 wherein said step of relatively moving said mold members comprises the steps of relatively moving a male mold having a male plug assist and a female mold having a female mold cavity between positions removed from opposite sides of said sheets to closed positions in which a portion of said male plug assist is received in said female mold cavity and said central portion of said one foam sheet and an opposed contiguous central portion of the other sheet are moved out of the planes of said foam sheets.

5. The method set forth in claim 3 wherein the step of relatively moving said molds includes the step of relatively moving a female mold, provided with a first female mold cavity of a predetermined girth, and a male mold having a male plug assist, provided with a second female mold cavity of a lesser predetermined girth, between positions removed from opposite sides of said sheet to closed positions in which at least a portion of said male plug assist is received in said first female mold cavity to move said first and second, contiguous central portions of said sheets out of the plane of said sheets into said first female mold cavity and fuse said second central portions together; said step of applying differential forming pressures including the step of thereafter applying differential pressure to said first central portion of said one sheet to move said first central portion of said one sheet into said second female mold cavity in said male plug assist to form at least one rib in said one sheet.

6. The method as set forth in claim 1 wherein said mounting step includes the step of supporting a pair of continuous plastic superposed sheets on a single pair of laterally spaced, longitudinally extending support means and moving said superposed sheets in a longitudinal, downstream path of travel.

7. The method as set forth in claim 6 wherein said heating step is accomplished at a heating station, said pressing step and said pressure applying step being accomplished downstream of said heating station.

8. The method as set forth in claim 3 wherein said first and second central portions comprise first and second adjacent, strip sections respectively, said differential pressure applying step includes the step of applying differential pressure to said first strip sections of said one sheet to form a plurality of raised ribs interjacent said second strip sections.

9. The method as set forth in claim 3 wherein said second central portion comprises a first plurality of radially spaced, perimetrically extending strip sections and a second plurality of radially extending, perimetrically spaced strip sections joined to said first plurality of strip sections; said first central portion comprising a third plurality of strip sections interjacent said first and second pluralities of strip sections; said differential pressure applying step includes the step of applying differential pressure to said first and second pluralities of strip sections to form a plurality of radially extending, circumferentially staggered rib sections and a plurality of perimetrically extending raised rib sections interjacent said third plurality of strip sections.

10. The method as set forth in claim 4 wherein said male plug assist includes in the face of the mold, which engages said one sheet, a plurality of radially spaced, curvilinear cavities and a plurality of radially extending, circumferentially spaced cavities joined to said radially spaced cavities; said differential pressure applying step including the step of applying vacuum forces to said radially spaced, curvilinear cavities and said circumferentially spaced cavities to withdraw portions of said one sheet into said radially spaced, curvilinear cavities and said circumferentially spaced cavities and form a plurality of radially spaced curvilinear ribs joined by a plurality of circumferentially spaced, radially extending ribs.

11. A method of differential pressure forming a double wall plastic article with a pair of individual, deformable thermoplastic foam sheets comprising the steps of:

mounting said individual foam sheets, comprising said double wall, in face to face contiguous relation;

heating said contiguously disposed foam sheets to a forming temperature without bonding the foam sheets to each other;

then moving contiguous portions of said pair of foam sheets out of the plane of said foam sheets and into a mold cavity with a male plug assist;

bonding first opposed strip sections of said foam sheets disposed in said mold cavity together; and thereafter withdrawing second opposed strip portions of one foam sheet disposed in said cavity away from an opposed contiguous portion of the other sheet portion disposed in said cavity to form a plurality of ribs in said one foam sheet.

12. The method as set forth in claim 11 wherein said sheets are continuous, said mounting step includes supporting said continuous sheets on a single pair of laterally spaced, longitudinally extending rails and moving said sheets in a downstream path of travel.

13. The method as set forth in claim 11 wherein said step of fusing comprises fusing first opposed strip sections of said sheets surrounding said cavity to form the border of said article, and concurrently fusing opposed, radially spaced third strip sections of said one sheet portion within said cavity;

said withdrawing step includes the step of thereafter withdrawing radially spaced strip portions interjacent alternate ones of said third strip sections to form a plurality or radially spaced circumferentially extending ribs within said cavity.

14. The method as set forth in claim 13 wherein the step of withdrawing includes withdrawing strip portions having a radial width greater than the radial width of said fuzed strip sections.

15. A method of differential pressure forming a double wall plastic article with a pair of individual continuous, deformable thermoplastic foam sheets comprising the steps of:

supporting a pair of individual continuous, contiguously disposed, face to face deformable thermoplastic superposed foam sheets, without any parting material between said sheets, on a single pair of laterally spaced, longitudinally extending, support means, and moving said contiguously disposed superposed foam sheets in a longitudinal downstream path of travel;

heating said foam sheets at a heating station while maintaining the individuality of said sheets without any parting material between said sheets and without bonding the confronting faces of said foam sheets to each other; and thereafter differential pressure forming a double wall article in said pair of contiguous, foam sheets with a pair of opposed molds on opposite sides of said foam sheets at a forming station downstream of said heating station.

16. The method as set forth in claim 15 wherein said supporting and moving steps are accomplished by mounting said contiguous, superposed foam sheets on a single pair of laterally spaced, endless chains and moving the single set of chains in an endless path to move said foam sheets supported thereon in a downstream path from a heating station, at which the foam sheets are heated, to a position in which at least central portions of said sheets are disposed between a pair of relatively movable molds at said forming station.

17. The method as set forth in claim 16 wherein said forming steps includes intimately engaging said opposing foam sheets with said opposed molds and pressing said sheets together via said molds to fuse portions of said foam sheets between said molds and thereafter forming sheet strengthening ribs in another portion of at least one of said sheets adjacent said fused portions.

18. The method set forth in claim 17 wherein said fused portions of said sheets comprise a border of the article to be formed and said step of forming ribs comprises the step of thereafter applying differential pressure to a portion of said sheet within said border in a direction away from an opposing, contiguous portion within said border.

19. The method of differential pressure forming set forth in claim 15 wherein said forming step comprises forming an article having an endwall and a sidewall, said step of forming said sidewall includes compressing a portion of one sheet inwardly of the terminal end of said sidewall toward the other sheet but without deforming the exposed surface of the portion of the other sheet opposing the compressed portion of said one sheet to provide a latch receiving recess.

20. A method of differential pressure forming a double wall, plastic article with a pair of individual, deformable thermoplastic foam sheets comprising the steps of:

mounting said individual foam sheets in face to face contiguous relation;

heating said contiguously disposed sheets to forming temperature while maintaining the individuality of said contiguous foam sheets and without bonding the confronting faces of said foam sheets to each other;

then pressing perimetrical, continuous, opposing portions of said heated contiguous sheets together to bond said opposing portions and form a continuous perimetrical border of the wall about the entire perimeter of the article being formed; and thereafter applying differential forming pressures to a first central portion of at least one of said foam sheets within said border to move said central portion from a position contiguous with an opposing contiguous portion of the other foam sheet to a position removed from said opposing contiguous portion to form a central wall portion of said article.

21. A method of differential pressure forming a double wall, plastic article comprising the steps of:

mounting a pair of individual, generally planar, deformable thermoplastic foam sheets having uninterrupted confronting faces in interfacial contact;

heating said contiguously disposed foam sheets to forming temperature while maintaining the individuality of said foam sheets and without bonding the confronting faces to each other;

then pressing opposing portions of said heated contiguous foam sheets together to mechanically join said opposing portions by compressive force and form a perimetrical border of the wall of the article being formed; and thereafter applying differential forming pressure to a first central portion of at least one of said foam sheets within said border to move said central portion from a position contiguous with an opposing contiguous portion of the other sheet to a position removed from said opposing contiguous portion to form a central wall portion of said article.

22. A method of differential pressure forming a double wall, rib-reinforced, plastic article with a pair of individual juxtaposed, deformable, thermoplastic foam sheets comprising the steps of:

mounting said individual foam sheets in juxtaposition;

heating said juxtaposed foam sheets to forming temperature without bonding said foam sheets together, and placing said pair of juxtaposed foam sheets between opposing spaced apart mold members, while maintaining the individuality of said foam sheets, at least one of said mold members including rib forming mold cavities;

then moving said mold members between spaced apart positions and less spaced apart positions to press portions of said juxtaposed sheets together and fuse said portions to form a perimetrical border of the article being formed;

thereafter applying differential forming pressure to a first central portion of at least one of the foam sheets within said border to distend said first central portion of said one sheet away from a continuous first central portion of the other sheet into said rib-forming cavity to form a reinforcing rib;

23. A method of differential pressure forming a double wall, rib-reinforced, plastic article with a pair of deformable thermoplastic foam sheets comprising the steps of:

mounting said individual foam sheets in face to face opposed contiguous relation;

heating said contiguously disposed foam sheets to forming temperature while maintaining the individuality of said foam sheets, and without bonding the opposing faces to each other;

then pressing portions of said opposed heated contiguous foam sheets together so bond said portions by compressive force and form a perimetrical border of the article being formed; and thereafter applying differential forming pressure to a first central portion of at least one of said foam sheets within said border to move said first central portion from a position contiguous with an opposing contiguous portion of the other foam sheet in a direction away from the contiguous portion of the other of said foam sheets to a removed position spaced from said contiguous opposing portion of said other foam sheet to form a reinforcing rib.

* * * * *